US010735077B2

(12) United States Patent
Zhu et al.

(10) Patent No.: US 10,735,077 B2
(45) Date of Patent: Aug. 4, 2020

(54) METHOD, APPARATUS AND SYSTEM FOR BEAM ACQUISITION IN A WIRELESS SYSTEM

(71) Applicant: Intel IP Corporation, Santa Clara, CA (US)

(72) Inventors: Yuan Zhu, Beijing (CN); Jinyu Zhang, Beijing (CN); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 29 days.

(21) Appl. No.: 16/068,110

(22) PCT Filed: Feb. 4, 2016

(86) PCT No.: PCT/CN2016/073534
§ 371 (c)(1),
(2) Date: Jul. 4, 2018

(87) PCT Pub. No.: WO2017/132948
PCT Pub. Date: Aug. 10, 2017

(65) Prior Publication Data
US 2019/0028173 A1     Jan. 24, 2019

(51) Int. Cl.
*H04B 7/06*        (2006.01)
*H04B 7/0408*      (2017.01)
*H04L 5/00*        (2006.01)

(52) U.S. Cl.
CPC ......... *H04B 7/0695* (2013.01); *H04B 7/0408* (2013.01); *H04B 7/0617* (2013.01);
(Continued)

(58) Field of Classification Search
CPC ... H04B 7/00; H04B 7/02; H04B 7/04; H04B 7/06; H04B 7/024; H04B 7/0408;
(Continued)

(56) References Cited

U.S. PATENT DOCUMENTS 8,942,134 B1 *   1/2015   Kludt et al.
2009/0116565 A1 *   5/2009   Ahn et al.
(Continued)

FOREIGN PATENT DOCUMENTS

CN     103733542 A     4/2014
CN     103765794 A     4/2014
(Continued)

OTHER PUBLICATIONS

International Search Report based on application No. PCT/CN2016/073534 (6 pages) dated Oct. 13, 2016 (Reference Purpose Only).
(Continued)

*Primary Examiner* — Marsha D Banks Harold
*Assistant Examiner* — Dharmesh J Patel
(74) *Attorney, Agent, or Firm* — Kowert, Hood, Munyon, Rankin & Goetzel, P.C.

(57) ABSTRACT

Machine-readable media, methods, apparatus and system for beam acquisition in a wireless system are disclosed. In some aspects, a base station may include a transceiver configured to map beam reference signals onto a plurality of transmission beams. The base station may further include a control module configured to divide the transmission beams into a plurality of groups, based at least in part on a plurality of logical indexes assigned to the transmission beams. The control module may be further be configured to divide the transmission beams of each of the groups into a plurality of sub-groups. The control module may be further configured to change a transmission beam order in at least one of the groups, in order to equalize and maximize logical index differences between transmission beams, which are adjacent to one another in a respective sub-group.

20 Claims, 10 Drawing Sheets

(52) U.S. Cl.
CPC ......... *H04B 7/0619* (2013.01); *H04L 5/0051* (2013.01); *H04L 5/0007* (2013.01)

(58) Field of Classification Search
CPC .. H04B 7/0478; H04B 7/0617; H04B 7/0619; H04B 7/0684; H04B 7/0686; H04B 7/0695; H04L 5/0007; H04L 5/0048; H04L 5/0051; H04L 25/0224; H04W 72/085; H01Q 21/061
See application file for complete search history.

(56) References Cited

U.S. PATENT DOCUMENTS

| | | |
|---|---|---|
| 2010/0054200 A1 | 3/2010 | Tsai |
| 2013/0039345 A1* | 2/2013 | Kim et al. |
| 2013/0059619 A1 | 3/2013 | Kim et al. |
| 2014/0211731 A1 | 7/2014 | Inoue et al. |

FOREIGN PATENT DOCUMENTS

| | | |
|---|---|---|
| CN | 104025469 A | 9/2014 |
| CN | 104604170 A | 5/2015 |
| EP | 2894801 A1 | 7/2015 |
| WO | 2013100719 A1 | 7/2013 |

OTHER PUBLICATIONS

"Technical Specification Group Radio Access Network; Requirements for Evolved Utra (E-UTRA) and Evolved UTRAN (E-UTRAN)", 3GPP TR 25.913, 3rd Generation Partnership Project, Dec. 2009, V9.0.0.

* cited by examiner

METHOD, APPARATUS AND SYSTEM FOR BEAM ACQUISITION IN A WIRELESS SYSTEM

CROSS-REFERENCE TO RELATED APPLICATIONS

This patent application is a national stage entry of International Application No. PCT/CN2016/073534 under 35 U.S.C. §§ 365 and 371, filed on Feb. 4, 2016. The disclosure of the foregoing document is incorporated herein by reference in its entirety and for all purposes.

FIELD

Aspects of the present disclosure relate generally to the field of beam acquisition in a wireless system, and more particularly, to the beam acquisition in a $5^{th}$ generation wireless system implemented with centralized-radio access network (C-RAN) technologies.

BACKGROUND

In a wireless network, e.g., a $5^{th}$ generation wireless network implemented with C-RAN technologies, an evolved Node B (eNB) may have a large number of transmission beams to support massive multiple-input, multiple-output (MIMO). For receiving beam acquisition, beam reference signals (BRS) mapped on the transmission beams are transmitted to a user equipment (UE) connected with the eNB via the wireless network.

BRIEF DESCRIPTION OF THE DRAWINGS

Aspects of the present disclosure are illustrated by way of example, and not by way of limitation, in the figures of the accompanying drawings in which like reference numerals refer to similar elements.

DETAILED DESCRIPTION

Illustrative aspects of the present disclosure include, but are not limited to, methods, systems, and apparatuses for beam acquisition in a wireless system, for example, in a $5^{th}$ generation wireless system implemented with centralized-radio access network (C-RAN) technology.

Various aspects of the illustrative aspects will be described using terms commonly employed by those skilled in the art to convey the substance of their work to others skilled in the art. However, it will be apparent to those skilled in the art that some alternate aspects may be practiced using with portions of the described aspects. For purposes of explanation, specific numbers, materials, and configurations are set forth in order to provide a thorough understanding of the illustrative aspects. However, it will be apparent to one skilled in the art that alternate aspects may be practiced without the specific details. In other instances, well-known features are omitted or simplified in order to not obscure the illustrative aspects.

Further, various operations will be described as multiple discrete operations, in turn, in a manner that is most helpful in understanding the illustrative aspects; however, the order of description should not be construed as to imply that these operations are necessarily order dependent. In particular, these operations need not be performed in the order of presentation.

The phrase "in one aspect" is used repeatedly. The phrase generally does not refer to the same aspect; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Although specific aspects have been illustrated and described herein, it will be appreciated by those of ordinary skill in the art that a wide variety of alternate and/or equivalent implementations may be substituted for the specific aspects shown and described, without departing from the scope of the aspects of the present disclosure. This application is intended to cover any adaptations or variations of the aspects discussed herein. Therefore, it is manifestly intended that the aspects of the present disclosure be limited only by the claims and the equivalents thereof.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
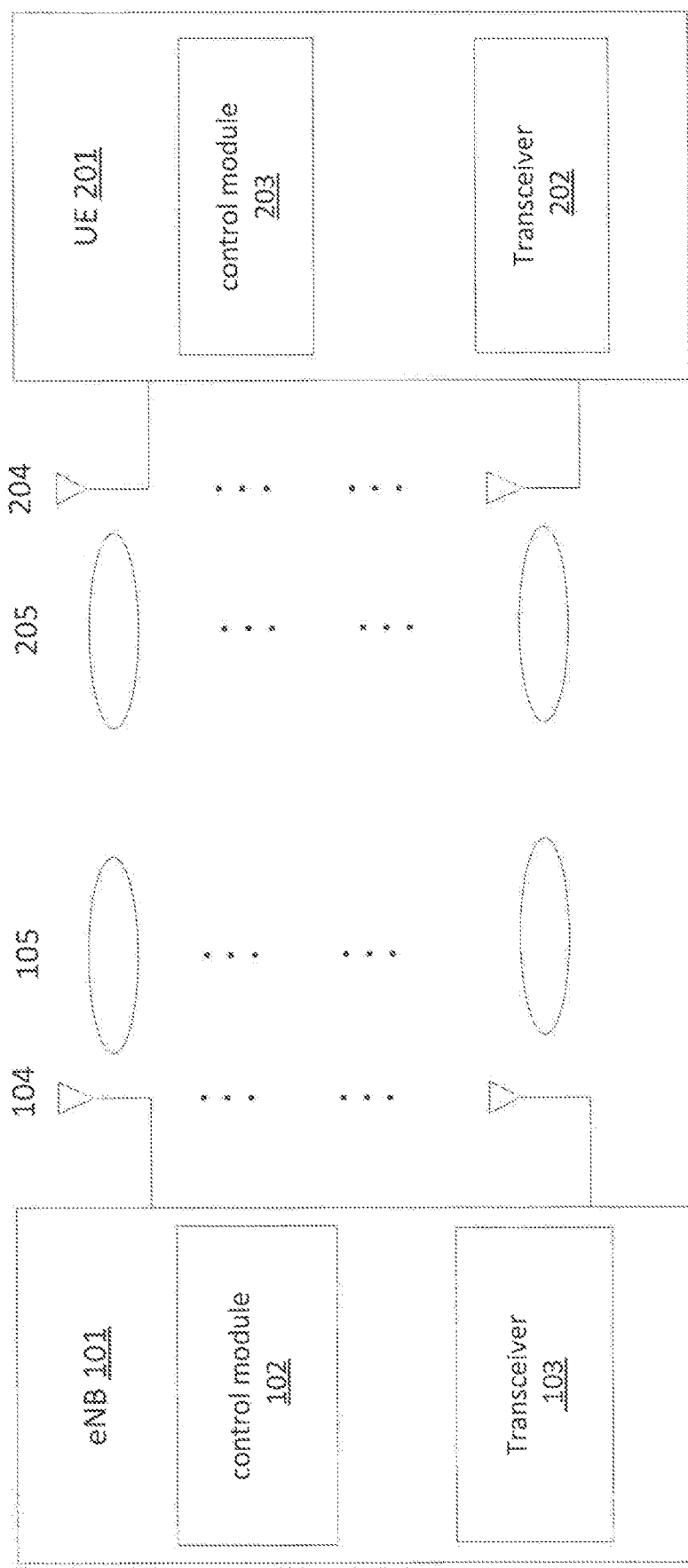
FIG. 1 schematically illustrates a wireless system including an evolved Node B (eNB) and a user equipment (UE) for beam acquisition, in accordance with various aspects.

FIG. 1 schematically illustrates a wireless system including an evolved Node B (eNB) 101 and a user equipment (UE) 201 for beam acquisition, in accordance with various aspects. In some aspects, the eNB 101 may include a control module 102, a transceiver 103, a plurality of antennas 104, and others. The control module 102 may control a transmission beam pattern for a plurality of transmission beams 105 generated by the plurality of antennas 104. Beam reference signals (BRSs) used to measure channel state and quality for each of the transmission beams 105 may be mapped on the transmission beams 105, for example, by the transceiver 103. In some aspects, the transceiver 103 may further transmit information via the transmission beams 105 to the UE 201. The information may include a BRS sub-frame in the transmission beam pattern controlled by the control module 102.

In various aspects, the UE 201 may include a transceiver 202, a control module 203, a plurality of antennas 204 and others. The transceiver 202 may receive information via receiving beams 205 generated by the plurality of antennas 204, from the eNB 101. The information may include the BRS subframe in the transmission beam pattern controlled by the control module 102. The control module 203 may scan the transmission beams 105 received from the eNB 101 for each of the receiving beams 205, and search for a best pair of a receiving beam and a transmission beam at least in part based on the receiving power of the BRSs (BRS_RP), so that the UE 201 may use the best pair of the receiving beam and transmission beam to receive transmissions from the eNB 101.

In various aspects, the transmission beam pattern may be arranged so that each of the receiving beams 205 may only need to scan a part of the transmission beams, rather than all of the transmission beams, in order to obtain the best pair of the receiving beam and the transmission beam. This way may help to shorten the time needed for the beam acquisition.

Figure 2:
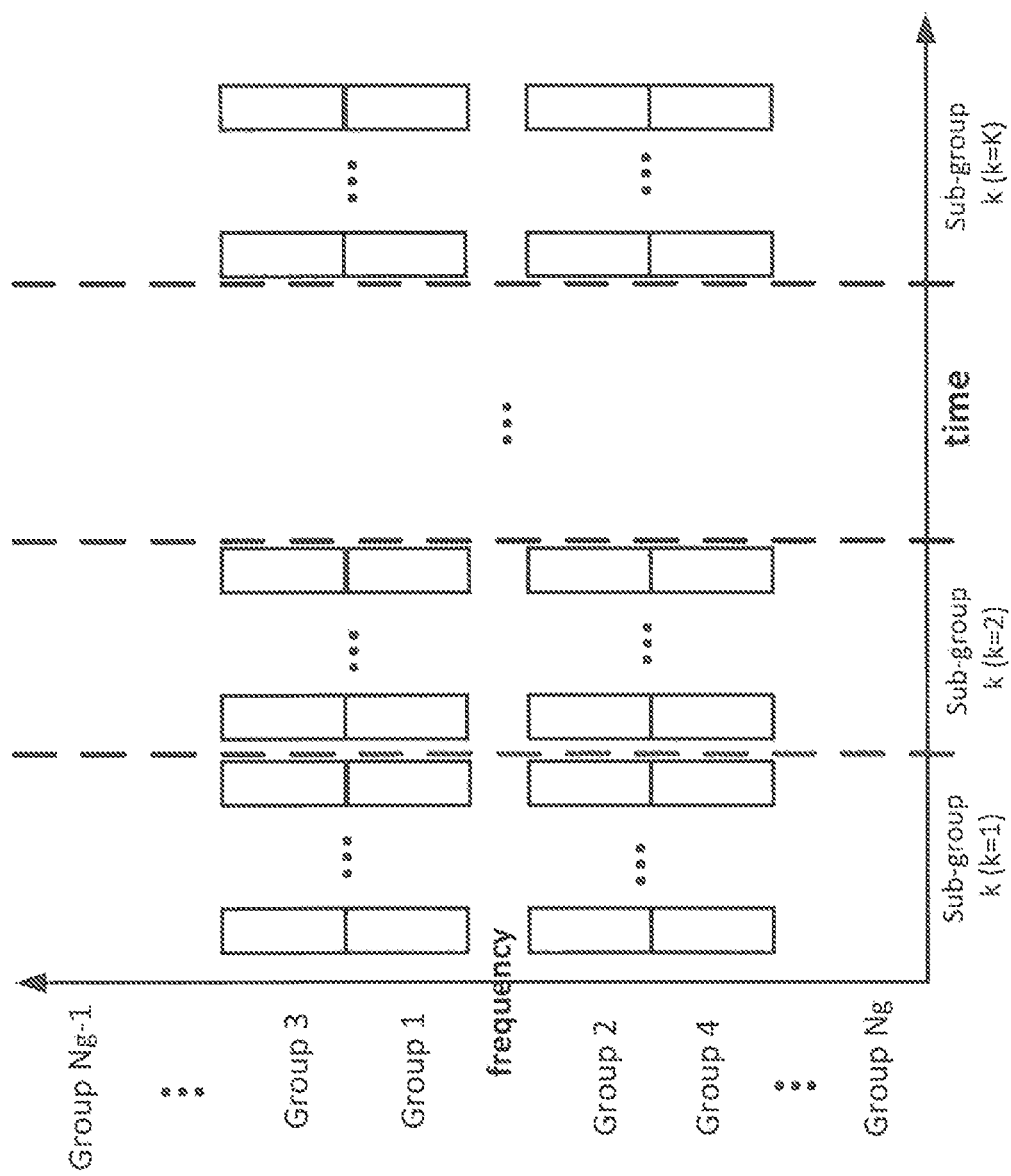
FIG. 2 schematically illustrates a transmission beam pattern in frequency-time domain, in accordance with various aspects.

FIG. 2 schematically illustrates the transmission beam (Tx beam) pattern in frequency-time domain, in accordance with various aspects. Each block shown in FIG. 2 may represent one of the transmission beams 105. In some aspects, the transmission beams 105 may be divided into one or more groups, e.g., $N_g$ groups, wherein $N_g$ represents the number of the groups. In some aspects, $N_g$ may be determined at least in part based on the number of the transmission beams and the number of orthogonal frequency division multiplexing (OFDM) symbols, in which different transmission beams may be transmitted in different OFDM symbols. For example, if 48 transmission beams are to be transmitted in 12 OFDM symbols, the 48 transmission beams may be divided into 4 groups, with the number of the transmission beams in each group (e.g., $N_L$ transmission beams) equal to the number of the OFDM symbols (e.g., $N_L$=12).

In some aspects, each group of the transmission beams, such as the transmission beams in group 1, may be further divided into a number of sub-groups. In some aspects, the number of the sub-groups, e.g., K sub-groups, may be determined at least in part based on the number of the transmission beams and/or the number of the transmission beam groups (e.g., $N_g$). For example, if the antenna 104 generates 48 transmission beams, which are divided into 4 groups, then each group of the transmission beams may be further divided into 3 sub-groups. However, it should be understood that the eNB may determine that the each group may be divided into any other number of the sub-groups.

Figure 3:
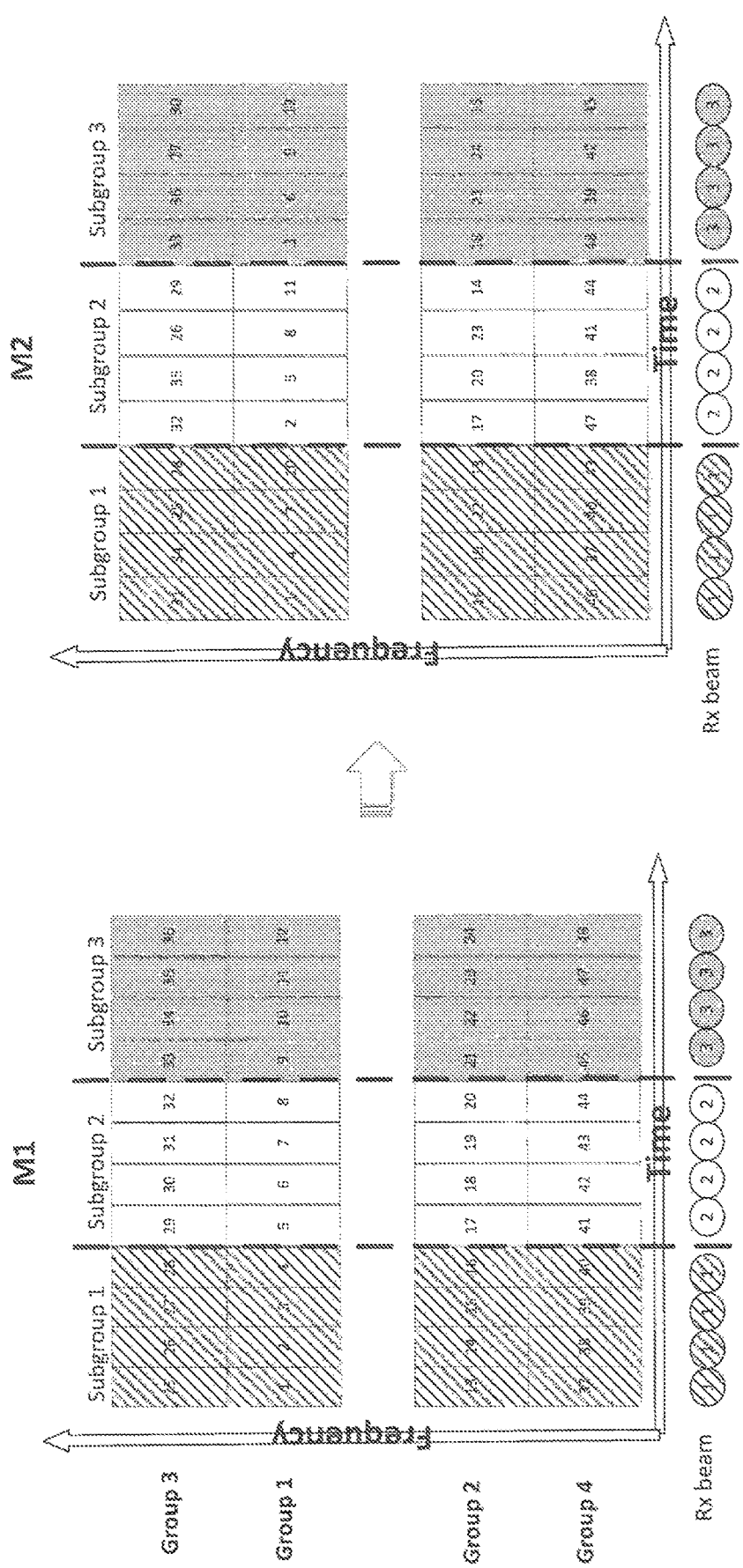
FIG. 3 schematically illustrates a first process of changing the transmission beam pattern in the frequency-time domain, in accordance with various aspects.

FIG. 3 schematically illustrates a first process of changing the transmission beam pattern in the frequency-time domain, in accordance with various aspects. The matrix M1 may represent the transmission beam pattern before the first change process and matrix M2 may represent the transmission beam pattern after the first change process. Taking the transmission beams 104 being divided into $N_g$ groups at least in part based on the N_Sym OFDM symbols, each element (i, j) in the matrix M1 or M3 may indicate the transmission beam in the $i^{th}$ group, which may correspond to the $j^{th}$ symbol. Taking 48 transmission beams in 4 groups as an example, blocks marked with logical indexes 1-12 may represent 12 transmission beams in group 1, blocks marked with logical indexes 13-24 may represent 12 transmission beams in group 2, blocks marked with logical indexes 25-36 may represent 12 transmission beams in group 3 and blocks marked with logical indexes 37-48 may represent 12 transmission beams in group 4.

Moreover, each group of the transmission beams may be further divided into a number of sub-groups at least in part based on the number of the transmission beams and/or the number of the transmission beam groups, so that one receiving beam 205 may correspond to one sub-group in each of the groups. Taking 48 transmission beams, which may be divided into 4 groups as an example, the 12 transmission beams in each group (e.g., each of the groups 1-4) may be further divided into 3 sub-groups with each sub-group having 4 transmission beams, and one receiving beam 205 may correspond to one sub-group in each of the groups 1-4. For example, as shown in the matrix M1 of FIG. 3, receiving beam 1 may correspond to 4 sub-groups respectively from 4 groups, i.e., transmission beams 1-4 from group 1, transmission beams 13-16 from group 2, transmission beams 25-28 from group 3 and transmission beams 37-40 from group 4. The similar may be applied to other receiving beams, such as the receiving beam 2 and the receiving beam 3.

Figure 4:
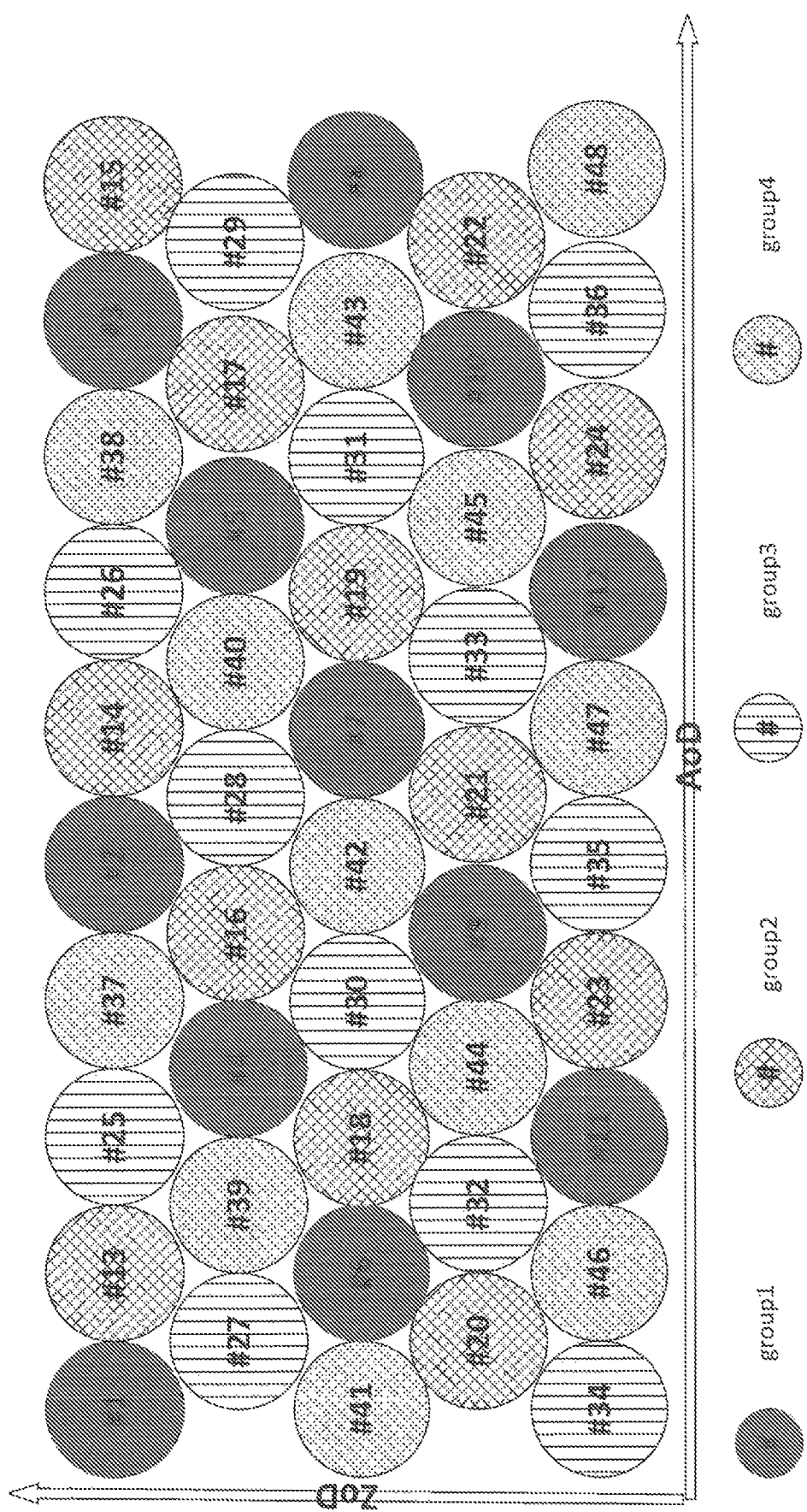
FIG. 4 schematically illustrates the transmission beam pattern in Azimuth angles of departure (AoD)-Zenith angles of departure (ZoD) domain before the first change process, in accordance with various aspects.

FIG. 4 schematically illustrates the transmission beam pattern in Azimuth angles of departure (AoD)-Zenith angles of departure (ZoD) domain before the first change process, in accordance with various aspects. In some aspects, the transmission beam pattern in the AoD-ZoD domain as shown in FIG. 4 may correspond to the transmission beam pattern in the frequency-time domain before the change process, namely, the transmission beam pattern of matrix M1. Each circle marked with a logical index in FIG. 4 may correspond to the block marked in the same logical index in matrix M1 of FIG. 3.

As shown in FIG. 4, different transmission beams may cover different AoDs and/or ZoDs, which may indicate different beam reference signals. In order to search for best pair of transmission beam and receiving beam, each receiving beam may be scanned for the corresponding transmission beams (e.g., the 16 transmission beams corresponding to the receiving beam 1 as shown in the matrix M1), and channel measurement based on the BRS mapped on the transmission beams may be performed.

Considering that the channel measurement may be performed between the receiving beam and a part of the transmission beams, rather than the total transmission beams, it may be desired that the part of the transmission beams corresponding to the receiving beam may be more evenly distributed in the AoD-ZoD domain and/or cover a scope of the AoD-ZoD domain as large as possible, so that the possibility of losing the best pair of transmission beam and receiving beam may be reduced while the efficiency may be increased. Examples of evenly distribution may include that spatial differences in the AoD-ZoD domain for every two adjacent transmission beams in one sub-group are as large as and as close as possible, wherein the two adjacent transmission beams may refer to the two transmission beams adjacent to each other in the frequency-time domain.

Before the first change process, although the logical index of each transmission beams may be numbered at $N_g$ interval so that every two adjacent transmission beams in frequency-time domain (e.g., beams 1 and 2 of matrix M1 in FIG. 3) has $N_g$–1 beams' interval in the AoD-ZoD domain as shown in FIG. 4, the transmission beams corresponding to one receiving beam are not evenly distributed in the AoD-ZoD domain. For example, the transmission beams corresponding to the receiving beams 1, including beams 1, 2, 3 and 4 of group 1, beams 13, 14, 15 and 16 of group 2, beams 25, 26, 27 and 28 of group 3 and beams 37, 38, 39 and 40 of group 4 may locate in the upper part of the AoD-ZoD domain in FIG. 4.

Therefore, the transmission beam order for each group may be changed so that the logical index differences for every two adjacent transmission beams in every sub-group may be as large as while as close as possible. Matrix M2 of FIG. 3 may illustrate the transmission beam pattern in the frequency-time domain after the first change process. In some aspects, an element (i2, j2) of the matrix M2 may be obtain based on following equations:

$$i1 = i2;$$
$$j1 = \left[((j2-1) \bmod N\_Sym * K + \left\lfloor \frac{(j2-1)}{N\_Sym} \right\rfloor + (i2-1)*K \right] \bmod N_L + 1$$
$$i1, i2 \in [1, N_g], j1, j2 \in [1, N_L]$$

wherein, (i1, j1) may represent an element of the matrix M1 before the first change process in which i1 may represent an old group number that the transmission beam corresponds to before the first change process, j1 may represent an old orthogonal frequency division multiplexing (OFDM) symbol number that the transmission beam corresponds to before the first change process, i2 may represent a new group number that the transmission beam belongs to after the first change process, j2 may represent a new OFDM symbol number that the transmission beam corresponds to after the first change process, $N_g$ may represent the number of the groups, K may represent the number of sub-groups, $N_L$ may represent the number of the transmission beams in each of the groups, and N_Sym may represent the number of the transmission beams in each of the sub-groups.

As illustrated in the matrix M2, transmission beams of group 1 that correspond to the receiving beam 1 (namely, the transmission beams in sub-group 1 of the group 1) may be changed from beams 1, 2, 3 and 4 to beams 1, 4, 7 and 10 based on the above equations, so that the logical index differences for every two adjacent beams (e.g., beams 1 and 4, beams 4 and 7, beams 7 and 10) may be equalized and maximized. The similar may be applied to other transmission beams in the group 1 that correspond to other receiving beams, and/or to other groups.

Figure 5:
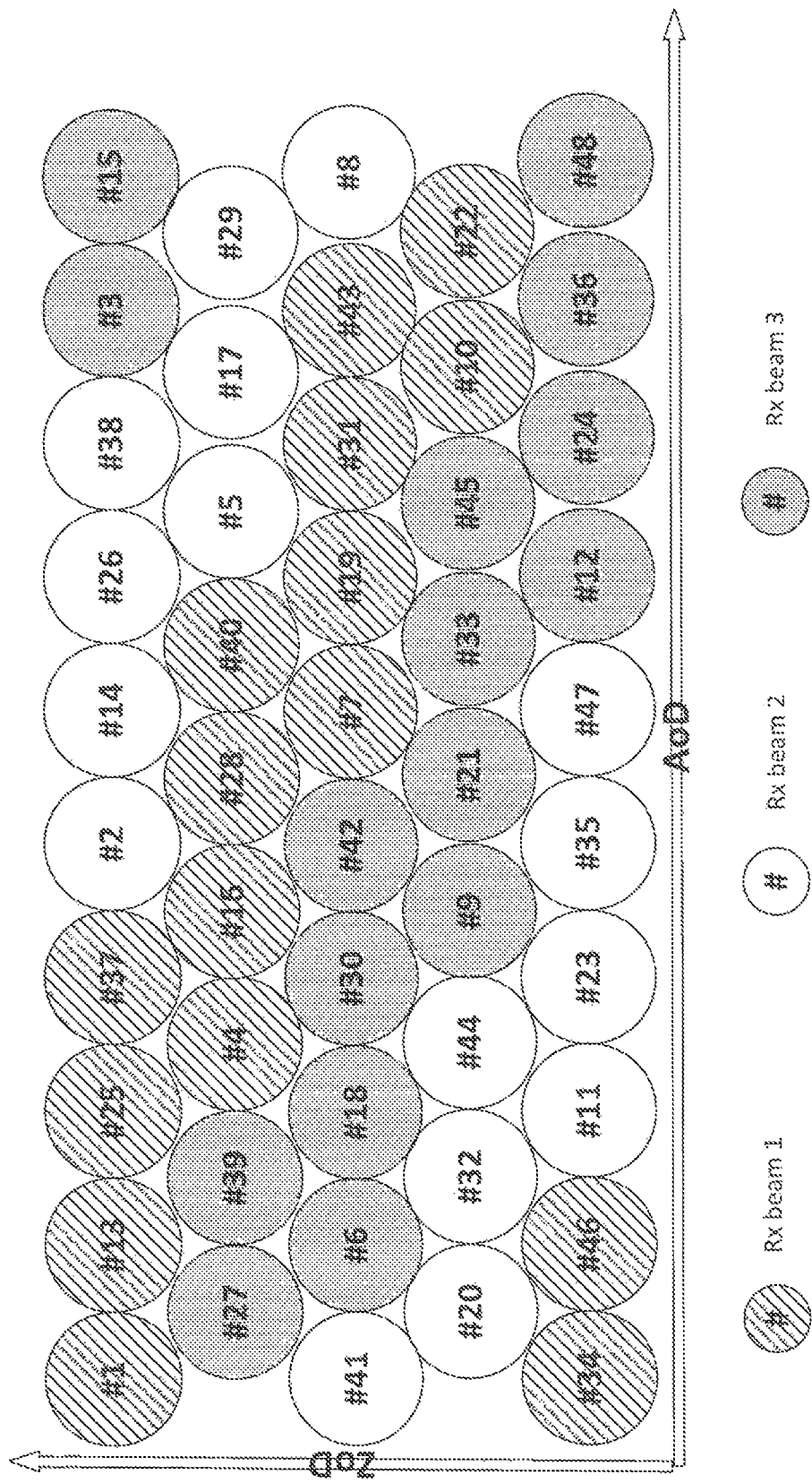
FIG. 5 schematically illustrates the transmission beam pattern in AoD-ZoD domain after the first change process, in accordance with various aspects.

It may be seen from FIG. 5, which schematically illustrates the transmission beam pattern in AoD-ZoD domain after the first change process in accordance with various aspects, that the transmission beams of each group that corresponding to one receiving beam may distribute more evenly in the AoD-ZoD domain. For example, beams 1, 4, 7 and 10 of group 1, beams 16, 19, 22 13 of group 2, beams 31, 34, 25 and 28 of group 3, and beams 46, 37, 40 and 43 of group 4 that correspond to the receiving beam 1 in the matrix M2 may distribute more evenly in the AoD-ZoD domain (some of them may cover lower part of the AoD-ZoD domain) compared to the beams 1, 2, 3 and 4 of group 1, beams 13, 14, 15 and 16 of group 2, beams 25, 26, 27 and 28 of group 3 and beams 37, 38, 39 and 40 of group 4 that correspond to the receiving beam 1 in matrix M1. This may similarly apply to the beams corresponding to the other receiving beams.

Figure 6:
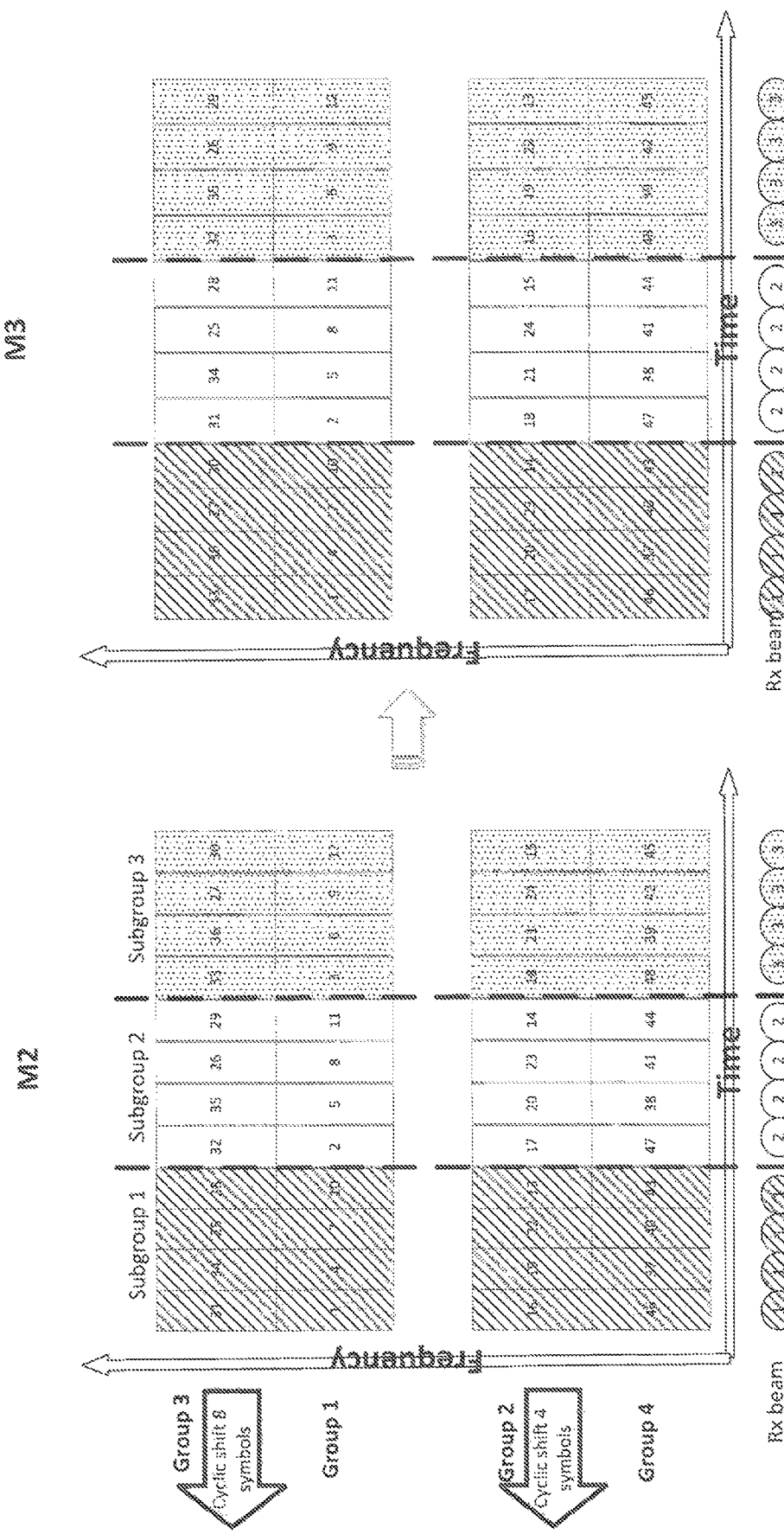
FIG. 6 schematically illustrates a second process of changing the transmission beam pattern in the frequency-time domain, in accordance with various aspects.

FIG. 6 schematically illustrates a second process of changing the transmission beam pattern in the frequency-time domain, in accordance with various aspects. As illustrated, matrix M2 may represent the transmission beam pattern after the first change process but before the second change process, and matrix M3 may represent the transmission beam pattern after the second change process. In the second change process, each sub-group in each group may be assigned with a logical index, such as sub-groups 1, 2 and 3 of group 1, sub-groups 1, 2 and 3 of group 2, sub-groups 1, 2 and 3 of group 3, and sub-groups 1, 2 and 3 of group 4. It may be seen from the matrix M2 of FIG. 6 that all of the sub-groups that correspond to the receiving beam 1 may be given to the logical index 1. This may similarly occur to the sub-groups corresponding to the other receiving beams.

Referring back to FIG. 5, which schematically illustrates the transmission beam pattern in AoD-ZoD domain after the first change process in accordance with various aspects, most of the transmission beams in the sub-group with the logical index 0 may be distributed in the upper and left part of the AoD-ZoD domain. In order to obtain more evenly distributed transmission beams for each receiving beam, the beam order of the matrix M2 may be further adjusted in the second change process. In some aspects, the sub-group order in each of the groups may be changed, in order to minimize a reoccurrence rate for the logical indexes of the sub-groups corresponding to the same receiving beam. The matrix M3 of FIG. 6 may schematically illustrate the sub-group order after the second change.

In some aspects, an element (i3, j3) of the matrix M3 may be obtained based on following equations:

$$i2 = i3;$$
$$j2 = \text{pattern}\left[\left\lfloor \frac{j3-1}{N\_Sym} \right\rfloor + 1\right][i3] * N\_Sym + (j3-1) \bmod N\_Sym + 1;$$
$$i2, i3 \in [1, N_g]; j2, j3 \in [1, N_L]$$
$$\text{pattern}[k] = (\text{pattern}[1] + k - 1) \bmod K$$

wherein, (i2, j2) may represent an element of the matrix M2 before the second change process in which i2 may represent an old group number that the transmission beam belongs to before the second change process, j2 may represent an old orthogonal frequency division multiplexing (OFDM) symbol number that the transmission beam corresponds to before the second change process; i3 may represent a new group number the transmission beam belongs to after the change process; j3 may represent a new OFDM symbol that the transmission beam corresponds to after the second change process; $N_g$ represents the number of the groups; K may represent the number of the sub-groups in each of the groups; k may represent a $k^{th}$ sub-group in the each group; $N_L$ may represent the number of the transmission beams in the each group; N_Sym may represent the number of the transmission beams in each of the sub-groups. In some aspects, pattern[1] may be calculated based on a following equation:

$$\text{pattern}[1][i]=(i-1) \bmod K;$$

wherein i may represent $i^{th}$ element of pattern[1], the number of elements that pattern[1] has is equal to the number of the groups, $N_g$.

As illustrated in the matrix M3 of FIG. 6, the sub-group order corresponding to the receiving beam 1 may be changed from the sub-groups 1 of groups 1, 2 and 3, into sub-group 1 of group 1, sub-group 2 of group 2 and sub-group 3 of group 3 and sub-group 1 of group 4, so that the reoccurrence rate for the sub-group logical indexes corresponding to one receiving beam (e.g., the receiving beam 1) may be minimized. This may be similarly applied to the sub-groups corresponding to the other receiving beams. As a result, elements in the group 2 may be cyclic shifted for 4 symbols and elements in the group 3 may be cyclic shifted for 8 symbols, while elements of the groups 1 and 4 remain unchanged.

It should be understood that other aspects may implement other technologies for second change process. In some aspects, the pattern[1] may be calculated according to other methodology. For example, the sub-group order may be changed, so that the elements in groups 1 and 4 may remain unchanged, while elements in group 2 may be cyclic shifted for 4 symbols, and elements in group 3 may be cyclic shifted for 8 symbols.

Figure 7:
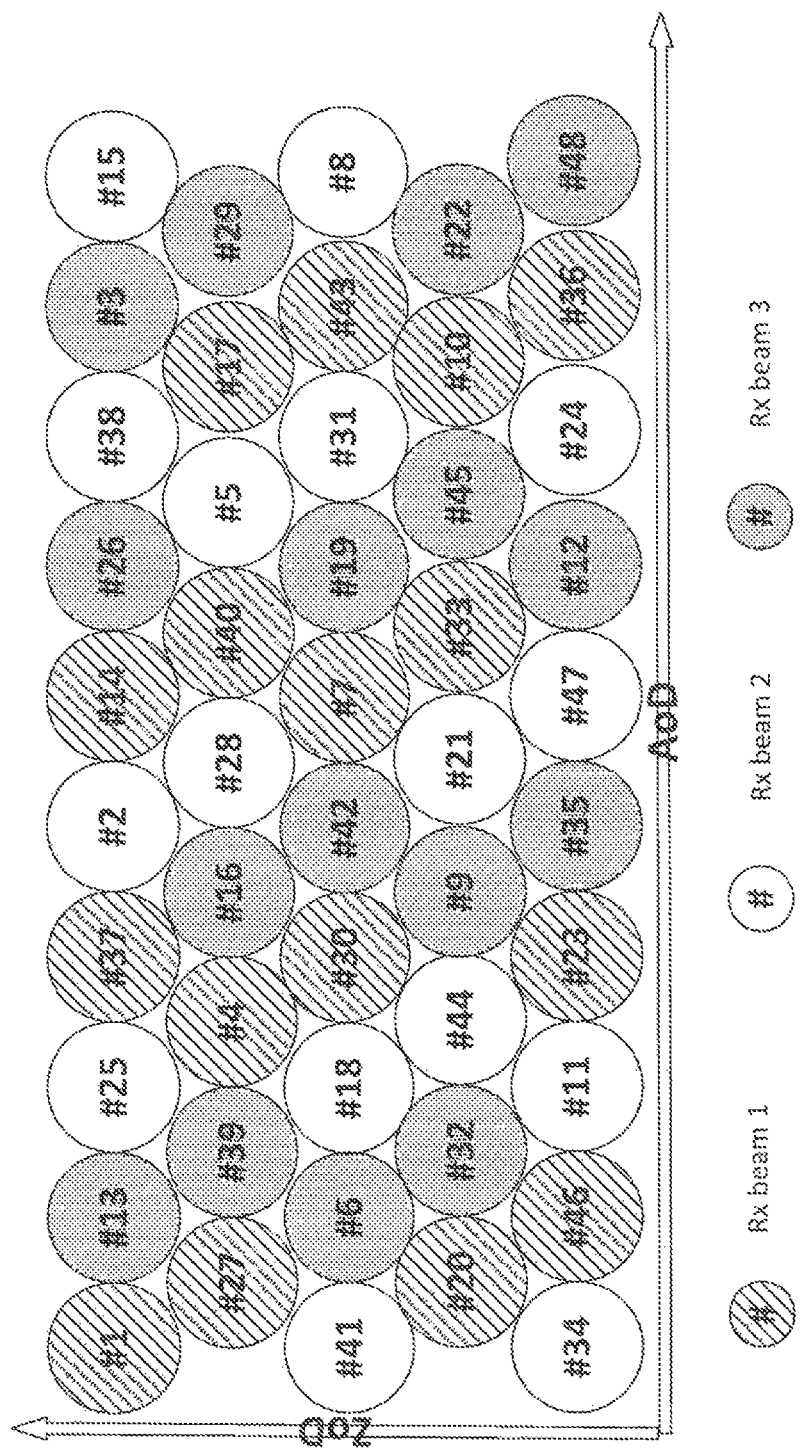
FIG. 7 schematically illustrates the transmission beam pattern in AoD-ZoD domain after the second change process, in accordance with various aspects.

FIG. 7 schematically illustrates the transmission beam pattern in AoD-ZoD domain after the second change process, in accordance with various aspects. As shown in FIG. 7, the transmission beams corresponding to the receiving beam 1, such as the beams 1, 4, 7 and 10 of group 1, beams 17, 20, 23 and 14 of group 2, beams 33, 36, 27 and 30 of group 3 and beams 46, 37, 40 and 43 of group 4 may distribute more evenly in the AoD-ZoD domain, so that the missing rate of the best pair of the transmission beam and the receiving beam may be further reduced while the searching efficiency is increased.

Figure 8:
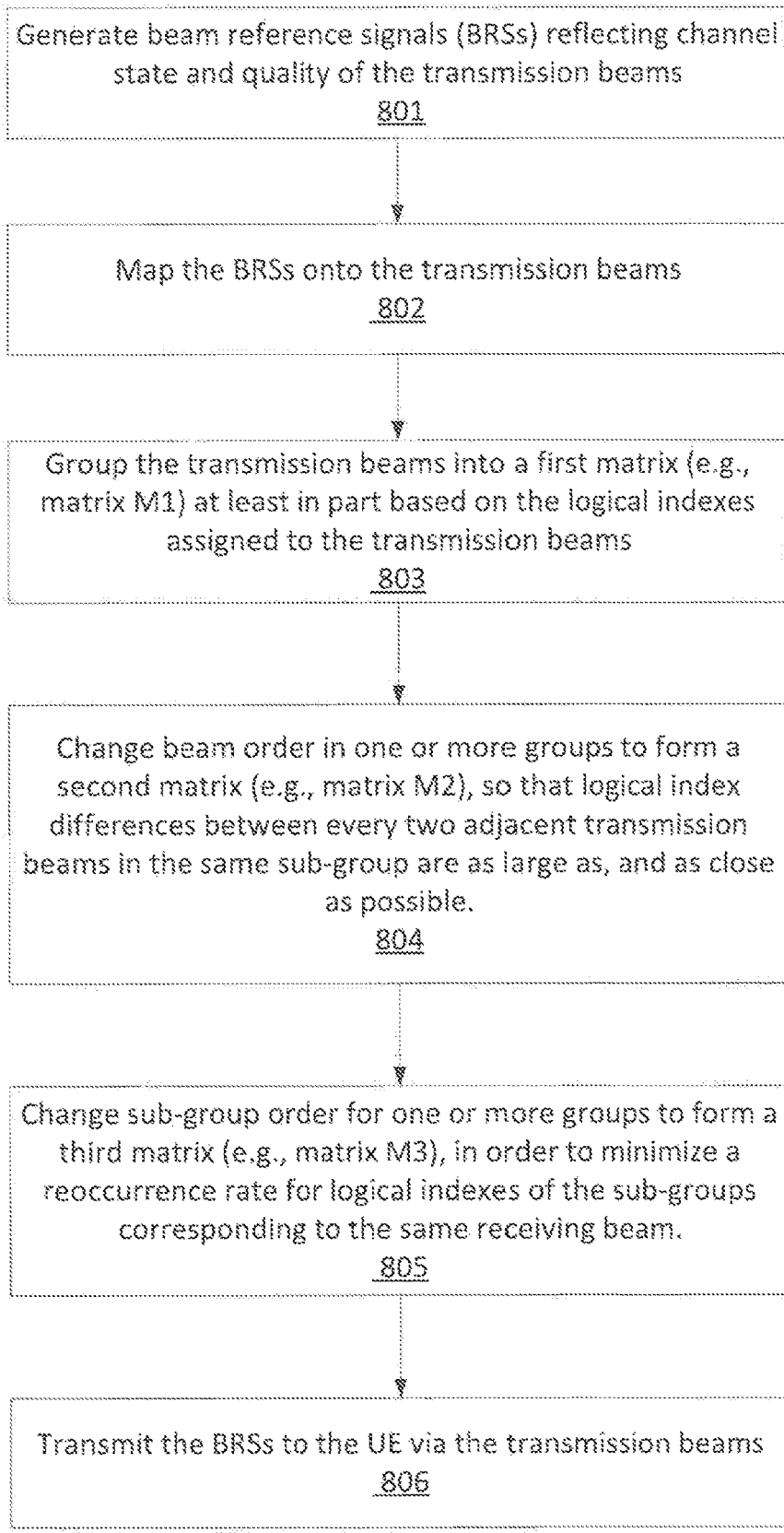
FIG. 8 schematically illustrates a method of generating and transmitting a subframe having beam reference signals (BRSs) mapped on the transmission beams by the eNB, in accordance with various aspects.

FIG. 8 schematically illustrates a method of generating and transmitting a subframe having beam reference signals (BRSs) mapped on the transmission beams by the eNB, in accordance with various aspects. In some aspects, the transceiver 103 or other devices of the eNB 101 may generate the BRSs, which may be used to measure channel state and/or quality of the transmission beams 105 in block 801. In block 802, the control module 102 or other devices map the BRSs onto the transmission beams 105. In some aspects, every transmission beam 105 may cover a different AoD-ZoD span as shown in any of FIGS. 4, 5 and 7, which may be used to carry different BRS.

In block 803, the control module 102 or other devices may group the transmission beams 105 into a first matrix in frequency-time domain (e.g., the matrix M1), at least in part based on the logical indexes assigned to the transmission beams 105. In some aspects, the transmission beams 105 may be divided into a number of groups (e.g., $N_g$ groups) at least in part based on the number of the transmission beams (e.g., N_BS transmission beams) and the number of the OFDM symbols (e.g., $N_L$ OFDM symbols), in which each element (i, j) in the matrix M1 may indicate the transmission beam in the $i^{th}$ group which may correspond to the $j^{th}$ symbol. Moreover, each group of the transmission beams may be further divided into a number of sub-groups at least in part based on the number of the receiving beams 205, with each of the receiving beams 205 corresponding to one sub-group in each of the groups.

In block 804, the control module 102 or other devices may change the transmission beam order in at least one of the groups to form a second matrix (e.g., the matrix M2) in the frequency-time domain. In some aspects, the beam order may be changed so that the logical index differences between every two adjacent beams in the same sub-group are as large as and as close as possible. For example, an element (i2, j2) of the matrix M2 may be obtained based on following equations:

$$i1 = i2;$$

$$j1 = \left[((j2-1)\text{mod}N\_\text{Sym}*K + \left\lfloor\frac{(j2-1)}{N\_\text{Sym}}\right\rfloor + (i2-1)*K\right]\text{mod}N_L + 1$$

$$i1, i2 \in [1, N_g], j1, j2 \in [1, N_L]$$

wherein, (i1, j1) may represent an element of the matrix M1 before the first change process in which i1 may represent an old group number that the transmission beam corresponds to before the first change process, j1 may represent an old orthogonal frequency division multiplexing (OFDM) symbol number that the transmission beam corresponds to before the first change process, i2 may represent a new group number that the transmission beam belongs to after the first change process, j2 may represent a new OFDM symbol number that the transmission beam corresponds to after the first change process, $N_g$ may represent the number of the groups, K may represent the number of sub-groups, $N_L$ may represent the number of the transmission beams in each of the groups, and N_Sym may represent the number of the transmission beams in each of the sub-groups.

In block 805, the control module 102 or other devices may further change the sub-group order in at least one of the groups to form a third matrix (e.g., the matrix M3). In some aspects, the sub-group order may be changed so that the reoccurrence rate of logical indexes of the sub-groups corresponding to the same receiving beams may be minimized. For example, an element (i3, j3) of the matrix M3 may be obtained based on following equations:

$$i2 = i3;$$

$$j2 = \text{pattern}\left[\left\lfloor\frac{j3-1}{N\_\text{Sym}}\right\rfloor + 1\right][i3] * N\_\text{Sym} + (j3-1)\text{mod}N\_\text{Sym} + 1;$$

$$i2, i3 \in [1, N_g]; j2, j3 \in [1, N_L]$$

$$\text{pattern}[k] = (\text{pattern}[1] + k - 1)\text{mod}K$$

wherein, (i2, j2) may represent an element of the matrix M2 before the second change process in which i2 may represent an old group number that the transmission beam belongs to before the second change process, j2 may represent an old orthogonal frequency division multiplexing (OFDM) symbol number that the transmission beam corresponds to before the second change process; i3 may represent a new group number the transmission beam belongs to after the change process; j3 may represent a new OFDM symbol that the transmission beam corresponds to after the second change process; $N_g$ represents the number of the groups; K may represent the number of the sub-groups in each of the groups; k may represent a $k^{th}$ sub-group in the each group; $N_L$ may represent the number of the transmission beams in the each group; N_Sym may represent the number of the transmission beams in each of the sub-groups. In some aspects, pattern[1] may be calculated based on a following equation:

$$\text{pattern}[1][i]=(i-1)\text{mod } K;$$

wherein i may represent $i^{th}$ element of pattern[1], the number of elements that pattern[1] has is equal to the number of the groups, $N_g$.

In block 806, the transceiver 103 or other devices may transmit the BRSs to the UE 201 via the transmission beams 105 under the transmission beam pattern controlled by the control module 102.

As illustrated in FIGS. 5 and 7, the transmission beams corresponding to the same receiving beam may distribute more evenly in the AoD-ZoD domain after the above-stated pattern change method.

It should be understood that other aspects may implement other technologies for the method in FIG. 8. For example, the pattern[1] may be calculated according to other methodology.

Figure 9:
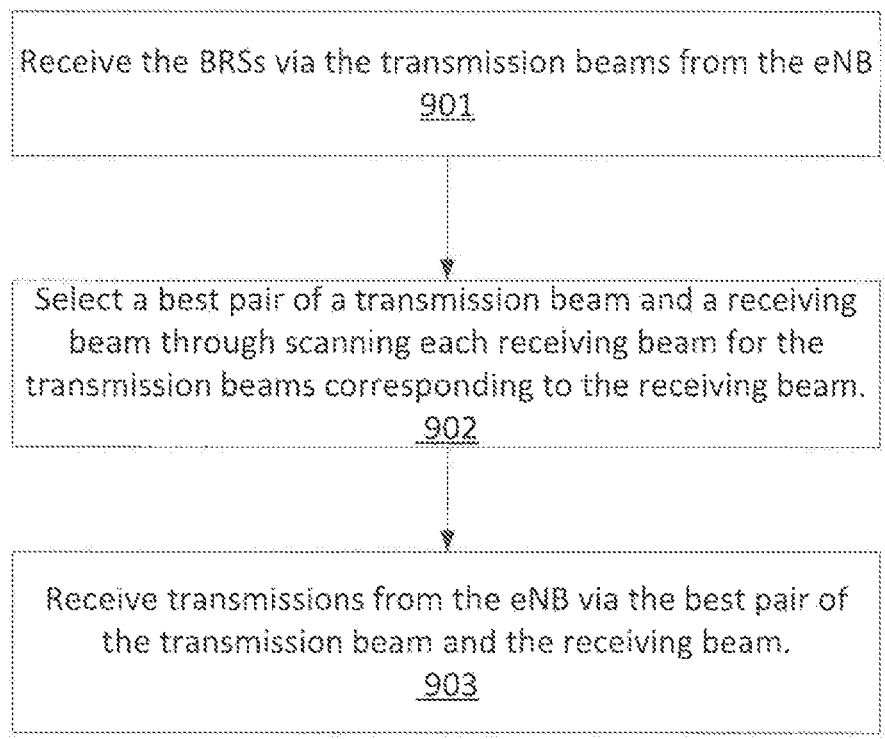
FIG. 9 schematically illustrates a method of receiving and acquiring a best pair of transmission beam-receiving beam by the UE, in accordance with various aspects.

FIG. 9 schematically illustrates a method of receiving and acquiring a best pair of transmission beam-receiving beam by the UE 201, in accordance with various aspects. In block 901, the transceiver 202 or other devices may receive the BRSs from the eNB 101 via the transmission beams 105. In some aspects, the pattern of the transmission beams 105 may be controlled by the control module 102 as stated in the above with regard to FIG. 8. In block 902, the control module 203 may select the best pair of the transmission beam and the receiving beam from the transmission beams 105 and the receiving beams 205 at least in part based on the receiving power of the BRSs (e.g., BRS_RP). In some aspects, each of the receiving beams may correspond to a part of the transmission beams 105, e.g., one sub-group from each group of the transmission beams, rather than all sub-groups from the each group, the measurement burden may be effectively reduced. Moreover, because the sub-groups of the transmission beams corresponding to the same receiving beams may distribute more evenly in the AoD-ZoD domain after the pattern change method as illustrated in FIG. 8, the possibility of missing the best pair may also be effectively reduced.

In block 903, the transceiver 202 or other devices may receive transmissions from the eNB 101 through using the best pair of the transmission beam and the receiving beams, such as the pair obtained in block 902.

Figure 10:
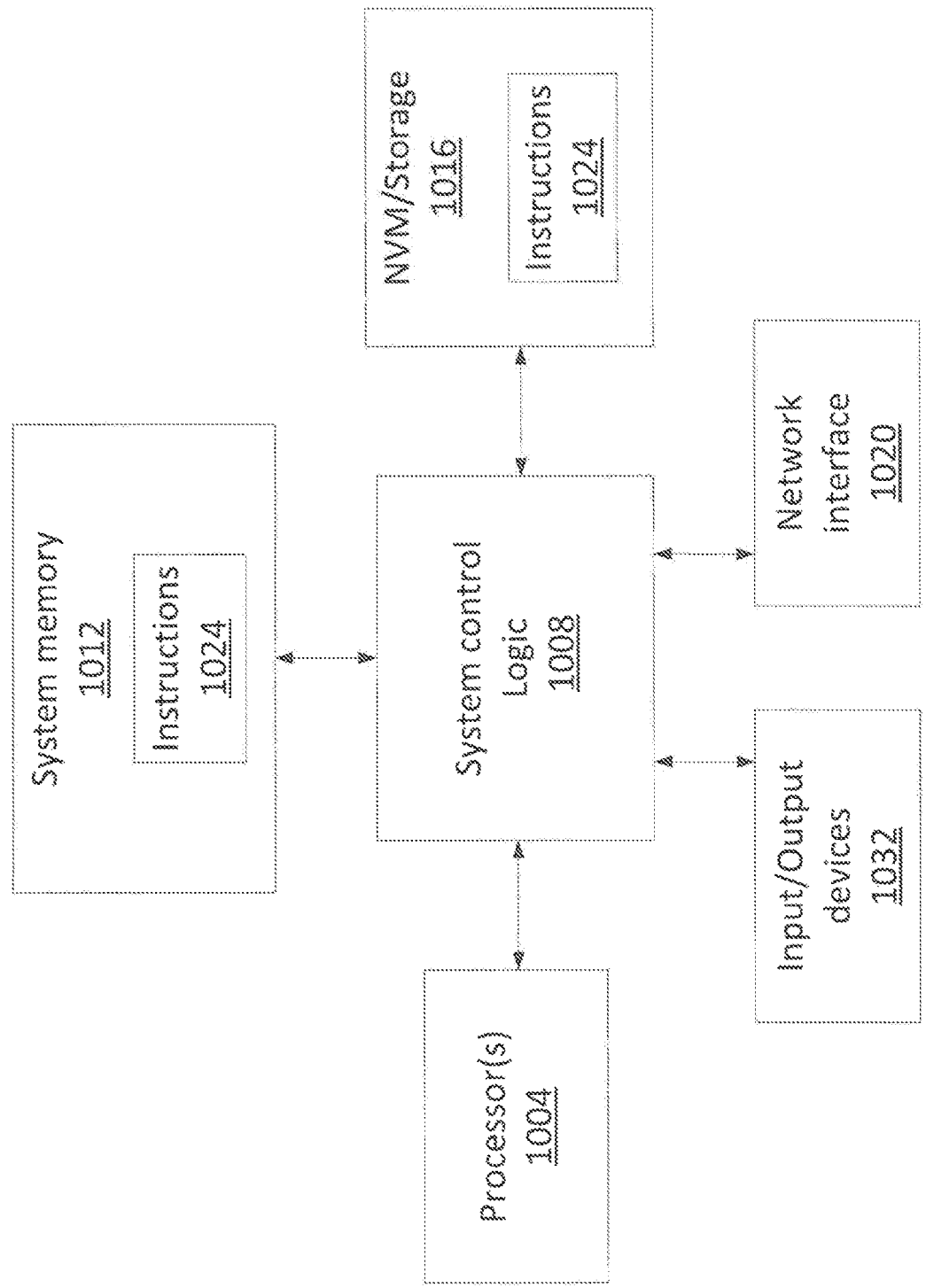
FIG. 10 schematically illustrates an example system in accordance with various aspects.

FIG. 10 schematically illustrates an example system in accordance with various aspects. In some aspects, the system 1000 may include one or more processor(s) 1004, system control logic 1008 coupled with at least one of the processor(s) 1004, system memory 1012 coupled with system control logic 1008, non-volatile memory (NVM)/storage 1016 coupled with system control logic 1008, and a network interface 1020 coupled with system control logic 1008.

Processor(s) 1004 may include one or more single-core or multi-core processors. Processor(s) 1004 may include any combination of general-purpose processors and dedicated processors (e.g., graphics processors, application processors, baseband processors, etc.). In an aspect in which the system 1000 implements the eNB 101, processors(s) 1004 may be configured to execute one or more aspect(s) as illustrated in FIGS. 2-8 in accordance with various aspects. In an aspect in which the system 1000 implements the UE 201, processors(s) 1004 may be configured to execute one or more aspect(s) as illustrated in FIG. 9 in accordance with various aspects.

System control logic 1008 for one aspect may include any suitable interface controllers to provide for any suitable interface to at least one of the processor(s) 1004 and/or to any suitable device or component in communication with system control logic 1008.

System control logic 1008 for one aspect may include one or more memory controller(s) to provide an interface to system memory 1012. System memory 1012 may be used to load and store data and/or instructions, for example, for system 1000. System memory 1012 for one aspect may include any suitable volatile memory, such as suitable dynamic random access memory (DRAM), for example.

NVM/storage 1016 may include one or more tangible, non-transitory computer-readable media used to store data and/or instructions, for example. NVM/storage 1016 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 1016 may include a storage resource physically part of a device on which the system 1000 is installed or it may be accessible by, but not necessarily a part of, the device. For example, the NVM/storage 1016 may be accessed over a network via the network interface 1020.

System memory 1012 and NVM/storage 1016 may respectively include, in particular, temporal and persistent copies of instructions 1024. Instructions 1024 may include instructions that when executed by at least one of the processor(s) 1004 result in the system 1000 implementing the method as described with reference to FIG. 8 or FIG. 9. In various aspects, instructions 1024, or hardware, firmware, and/or software components thereof, may additionally/alternatively be located in the system control logic 1008, the network interface 1020, and/or the processor(s) 1004.

In some aspects in which the system 1000 may implement the eNB 101, network interface 1020 may include the control module 102, the transceiver 103 and/or others as illustrated in FIG. 1, to provide a radio interface for system 1000 to communicate over one or more network(s) and/or with any other suitable device. In some aspects in which the system 1000 may implement the UE 201, network interface 1020 may include the transceiver 202, the control module 203 and/or others as illustrated in FIG. 1, to provide a radio interface for system 1000 to communicate over one or more network(s) and/or with any other suitable device. In various aspects, the network interface 1020 may be integrated with other components of system 1000. For example, the network interface may include a processor of the processor(s) 1004, memory of the system memory 1012, NVM/Storage of NVM/Storage 1016, and/or a firmware device (not being illustrated) having instructions that when executed by at least one of the processor(s) 1004 result in the system 1000 implementing the method as described with reference to FIG. 8 or FIG. 9.

Network interface 1020 may further include any suitable hardware and/or firmware, such as a plurality of antennas (e.g., the antenna 104 of eNB 101 or the antenna 204 of UE 201) to provide a multiple input, multiple output radio interface. Network interface 1020 for one aspect may be, for example, a network adapter, a wireless network adapter, a telephone modem, and/or a wireless modem.

For one aspect, at least one of the processor(s) 1004 may be packaged together with logic for one or more controller(s) of system control logic 1008. For one aspect, at least one of the processor(s) 1004 may be packaged together with logic for one or more controllers of system control logic 1008 to form a System in Package (SiP). For one aspect, at least one of the processor(s) 1004 may be integrated on the same die with logic for one or more controller(s) of system control logic 1008. For one aspect, at least one of the processor(s) 1004 may be integrated on the same die with logic for one or more controller(s) of system control logic 1008 to form a System on Chip (SoC).

The system 1000 may further include input/output (I/O) devices 1032. The I/O devices 1032 may include user interfaces designed to enable user interaction with the system 1000, peripheral component interfaces designed to enable peripheral component interaction with the system 1000, and/or sensors designed to determine environmental conditions and/or location information related to the system 1000.

In various aspects, the user interfaces could include, but are not limited to, a display (e.g., a liquid crystal display, a touch screen display, etc.), a speaker, a microphone, one or more cameras (e.g., a still camera and/or a video camera), a flashlight (e.g., a light emitting diode flash), and a keyboard.

In various aspects, the peripheral component interfaces may include, but are not limited to, a non-volatile memory port, an audio jack, and a power supply interface.

In various aspects, the sensors may include, but are not limited to, a gyro sensor, an accelerometer, a proximity sensor, an ambient light sensor, and a positioning unit. The positioning unit may also be part of, or interact with, the network interface 1020 to communicate with components of a positioning network, e.g., a global positioning system (GPS) satellite.

In various aspects, the system 1000 may be an eNB (e.g., the eNB 101) and/or a UE (e.g., the UE 201). In various aspects, the system 1000 may have more or less components, and/or different architectures.

The disclosure may include various aspects disclosed below.

In aspect 1, a method, to be employed by an evolved Node B (eNB), may include mapping beam reference signals (BRSs) onto a plurality of transmission beams; dividing the transmission beams into a plurality of groups, at least in part based on logical indexes assigned to the transmission beams; dividing the transmission beams of each of the groups into a plurality of sub-groups; and changing the transmission beam order in at least one of the groups, in order to equalize and maximize logical index differences between every two adjacent transmission beams in the same sub-group.

In aspect 2, the different transmission beams according to aspect 2 may cover different Azimuth angles of departure (AoD) and Zenith angles of departure (ZoD).

In aspect 3, the number of the groups according to any of aspects 1-2 may be determined based on the number of the transmission beams and the number of orthogonal frequency division multiplexing (OFDM) symbols.

In aspect 4, the number of the sub-groups according to any of aspects 1-3 may be determined at least in part based on the number of the transmission beams and/or the number of the transmission beam groups, and one receiving beam of a user equipment (UE) corresponds to one sub-group of each group of the transmission beams.

In aspect 5, the transmission beam order according to any of aspects 1-4 may be changed based on following equations:

$$i1 = i2;$$

$$j1 = \left[((j2-1) \bmod N\_Sym * K + \left[\frac{(j2-1)}{N\_Sym}\right] + (i2-1) * K\right] \bmod N_L + 1$$

$$i1, i2 \in [1, N_g], j1, j2 \in [1, N_L]$$

wherein, i1 represents an old group number that the transmission beam corresponds to before the beam order change, j1 represents an old orthogonal frequency division multiplexing (OFDM) symbol number that the transmission beam corresponds to before the beam order change, i2 represents a new group number that the transmission beam belongs to after the beam order change, j2 represents a new OFDM symbol number that the transmission beam corresponds to after the beam order change, $N_g$ represents the number of the groups, K represents the number of the sub-groups in each of the groups, $N_L$ represents the number of the transmission beams in each of the groups, and N_Sym represents the number of the transmission beams in each of the sub-groups.

In aspect 6, the method according to any of aspects 1-5 may further include changing sub-group order in at least one of the groups based on logical indexes assigned to the sub-groups, in order to minimize a reoccurrence rate for logical indexes of the sub-groups corresponding to the same receiving beam.

In aspect 7, the sub-group order according to any of aspects 1-6 may be changed based on a following equation:

$$i2 = i3;$$

$$j2 = \text{pattern}\left[\left[\frac{j3-1}{N\_Sym}\right]+1\right][i3] * N\_Sym + (j3-1) \bmod N\_Sym + 1;$$

$$i2, i3 \in [1, N_g], j2, j3 \in [1, N_L]$$

$$\text{pattern}[k] = (\text{pattern}[1] + k - 1) \bmod K$$

wherein, i2 represents an old group number that the transmission beam belongs to before the sub-group order change, j2 represents an old orthogonal frequency division multiplexing (OFDM) symbol number that the transmission beam corresponds to before the sub-group order change; i3 represents a new group number the transmission beam belongs to after the sub-group order change; j3 represents a new OFDM symbol that the transmission beam corresponds to after the sub-group order change; $N_g$ represents the number of the groups; K represents the number of the sub-groups in each of the groups; k represents a $k^{th}$ sub-group in the each group; $N_L$ represents the number of the transmission beams in the each group; N_Sym represents the number of the transmission beams in each of the sub-groups; wherein, pattern[1] is calculated based on a following equation:

$$\text{pattern}[1][i] = (i-1) \bmod K$$

wherein i presents $i^{th}$ element of pattern[1], the number of elements that pattern[1] has is equal to the number of the groups, $N_g$.

In aspect 8, the method according to any of aspects 1-7 may further include transmitting the BRSs via the transmission beams to a user equipment (UE).

In aspect 9, a method, to be employed by a user equipment (UE), may include receiving beam reference signals (BRSs) via groups of transmission beams from an evolved Node (eNB), wherein the transmission beams in each of the groups are divided into a plurality of sub-groups, so that one of receiving beams of the UE corresponds to one sub-group of each group of the transmission beams; selecting a pair of a receiving beam and a transmission beams from the receiving beams and the transmission beams, at least in part based on receiving power of the BRSs; and receiving information from the eNB via the pair of the receiving beam and the transmission beams.

In aspect 10, the different transmission beams according to aspect 9 may cover different Azimuth angles of departure (AoD) and Zenith angles of departure (ZoD).

In aspect 11, the number of the groups according to any of aspects 9-10 may be determined based on the number of the transmission beams and the number of orthogonal frequency division multiplexing (OFDM) symbols.

In aspect 12, the number of the sub-groups according to any of aspects 9-11 may be determined at least in part based on the number of the transmission beams and/or the number of the transmission beam groups.

In aspect 13, the logical index differences between every two adjacent transmission beams in one sub-group according to any of aspects 9-12 may be equalized and maximized.

In aspect 14, a reoccurrence rate for logical indexes assigned to the sub-groups corresponding to the same receiving beam according to any of aspects 9-13 may be minimized.

In aspect 15, an evolved Node B (eNB) may include a transceiver, to map beam reference signals (BRSs) onto a plurality of transmission beams; and a control module to divide the transmission beams into a plurality of groups, at least in part based on logical indexes assigned to the transmission beams; divide the transmission beams of each of the groups into a plurality of sub-groups; and change beam order of the transmission beams in at least one of the groups, in order to equalize and maximize logical index differences between every two adjacent transmission beams in the same sub-group.

In aspect 16, the different transmission beams according to any of aspect 15 may cover different Azimuth angles of departure (AoD) and Zenith angles of departure (ZoD).

In aspect 17, the number of the groups according to any of aspects 15-16 may be determined based on the number of the transmission beams and the number of orthogonal frequency division multiplexing (OFDM) symbols.

In aspect 18, the number of the sub-groups according to any of aspects 15-17 may be determined at least in part based on the number of the transmission beams and/or the number of the transmission beam groups, and one receiving beam of a user equipment (UE) corresponds to one sub-group of each group of the transmission beams.

In aspect 19, the beam order according to any of aspects 15-18 may be changed based on following equations:

$$i1 = i2;$$
$$j1 = \left[ ((j2-1) \bmod \text{N\_Sym} * K + \left\lfloor \frac{(j2-1)}{\text{N\_Sym}} \right\rfloor + (i2-1) * K \right] \bmod N_L + 1$$
$$i1, i2 \in [1, N_g], j1, j2 \in [1, N_L]$$

wherein, i1 represents an old group number that the transmission beam corresponds to before the beam order change, j1 represents an old orthogonal frequency division multiplexing (OFDM) symbol number that the transmission beam corresponds to before the beam order change, i2 represents a new group number that the transmission beam belongs to after the beam order change, j2 represents a new OFDM symbol number that the transmission beam corresponds to after the beam order change, $N_g$ represents the number of the groups, K represents the number of the sub-groups in each of the groups, $N_L$ represents the number of the transmission beams in each of the groups, and N_Sym represents the number of the transmission beams in each of the sub-groups.

In aspect 20, the control module according to any of aspects 15-19 may be further to change sub-group order in at least one of the groups based on logical indexes assigned to the sub-groups, in order to minimize a reoccurrence rate for logical indexes of the sub-groups corresponding to the same receiving beam.

In aspect 21, the sub-group order according to any of aspects 15-20 may be changed based on a following equation:

$$i2 = i3;$$
$$j2 = \text{pattern}\left[\left\lfloor \frac{j3-1}{\text{N\_Sym}} \right\rfloor + 1\right][i3] * \text{N\_Sym} + (j3-1) \bmod \text{N\_Sym} + 1;$$
$$i2, i3 \in [1, N_g], j2, j3 \in [1, N_L]$$
$$\text{pattern}[k] = (\text{pattern}[1] + k - 1) \bmod K$$

wherein, i2 represents an old group number that the transmission beam belongs to before the sub-group order change, j2 represents an old orthogonal frequency division multiplexing (OFDM) symbol number that the transmission beam corresponds to before the sub-group order change; i3 represents a new group number the transmission beam belongs to after the sub-group order change; j3 represents a new OFDM symbol that the transmission beam corresponds to after the sub-group order change; $N_g$ represents the number of the groups; K represents the number of the sub-groups in each of the groups; k represents a $k^{th}$ sub-group in the each group; $N_L$ represents the number of the transmission beams in the each group; N_Sym represents the number of the transmission beams in each of the sub-groups; wherein, pattern[1] is calculated based on a following equation:

$$\text{pattern}[1][i]=(i-1) \bmod K$$

wherein i presents $i^{th}$ element of pattern[1], the number of elements that pattern[1] has is equal to the number of the groups, $N_g$.

In aspect 22, the transceiver according to any of aspects 15-20 may be further to transmit the BRSs via the transmission beams to a user equipment (UE).

In aspect 23, a user equipment (UE) may include a transceiver, to receive beam reference signals (BRSs) via groups of transmission beams from an evolved Node (eNB), wherein the transmission beams in each of the groups are divided into a plurality of sub-groups, so that one of receiving beams of the UE corresponds to one sub-group of each group of the transmission beams; and a control module to select a pair of a receiving beam and a transmission beams from the receiving beams and the transmission beams, at least in part based on receiving power of the BRSs; wherein the transceiver is further to receive information from the eNB via the pair of the receiving beam and the transmission beams.

In aspect 24, the different transmission beams according to aspect 23 may cover different Azimuth angles of departure (AoD) and Zenith angles of departure (ZoD).

In aspect 25, the number of the groups according to any of aspects 23-24 may be determined based on the number of the transmission beams and the number of orthogonal frequency division multiplexing (OFDM) symbols.

In aspect 26, the number of the sub-groups according to any of aspects 23-25 may be determined at least in part based on the number of the transmission beams and/or the number of the transmission beam groups.

In aspect 27, the logical index differences between every two adjacent transmission beams in one sub-group according to any of aspects 23-26 may be equalized and maximized.

In aspect 28, a reoccurrence rate for logical indexes assigned to the sub-groups corresponding to the same receiving beam according to any of aspects 23-27 may be minimized.

Although certain aspects have been illustrated and described herein for purposes of description, a wide variety of alternate and/or equivalent aspects or implementations calculated to achieve the same purposes may be substituted for the aspects shown and described without departing from the scope of the present disclosure. This application is intended to cover any adaptations or variations of the aspects discussed herein. Therefore, it is manifestly intended that aspects described herein be limited only by the claims and the equivalents thereof.

What is claimed is:

1. A method, to be employed by a base station, the method comprising:
    mapping a plurality of beam reference signals (BRSs) onto a plurality of transmission beams;
    dividing the plurality of transmission beams into a plurality of groups, based at least in part on a plurality of logical indexes assigned to the plurality of transmission beams;
    dividing the plurality of transmission beams within each of the plurality of groups into a plurality of sub-groups, wherein a reoccurrence rate for logical indexes assigned to sub-groups of the plurality of sub-groups which correspond to the same receiving beam is minimized; and
    changing a transmission beam order in at least one of the plurality of groups, to equalize and maximize logical index difference between transmission beams of the plurality of transmission beams, which are adjacent to one another in a respective sub-group among the plurality of sub-groups.

2. The method of claim 1,
    wherein the plurality of transmission beams comprise different Azimuth angles of departure (AoD) and Zenith angles of departure (ZoD).

3. The method of claim 1,
    wherein the number of the plurality of groups is determined at least in part on the number of the plurality of transmission beams and the number of orthogonal frequency division multiplexing (OFDM) symbols.

4. The method of claim 1,
    wherein the number of the plurality of sub-groups is determined at least in part on the number of the plurality of transmission beams or the number of the plurality of groups, and
    a receiving beam of a user equipment (UE) corresponds to a sub-group in each group of the plurality of transmission beams.

5. The method of claim 1,
    wherein the transmission beam order is changed based on the following equations:

$$i1 = i2;$$
$$j1 = \left[(j2-1)\mathrm{mod}\mathrm{N\_Sym} * K + \left[\frac{(j2-1)}{\mathrm{N\_Sym}}\right] + (i2-1) * K\right]\mathrm{mod}N_L + 1$$
$$i1, i2 \in [1, Ng], j1, j2 \in [1, N_L]$$

wherein, i1 represents an old group number that a transmission beam of the plurality of transmission beams corresponds to before the transmission beam order change, j1 represents an old orthogonal frequency division multiplexing (OFDM) symbol number that the transmission beam corresponds to before the transmission beam order change, i2 represents a new group number that the transmission beam belongs to after the transmission beam order change, j2 represents a new OFDM symbol number that the transmission beam corresponds to after the transmission beam order change, Ng represents the number of the plurality of groups, K represents the number of the plurality of sub-groups in each of the plurality of groups, $N_L$ represents the number of transmission beams in each of the plurality of groups, and N_Sym represents the number of transmission beams in each of the plurality of sub-groups.

6. The method of claim 4, further comprising:
    changing a sub-group order in at least one of the plurality of groups, based at least in part on logical indexes assigned to the plurality of sub-groups to minimize a reoccurrence rate for logical indexes of the plurality of sub-groups corresponding to a receiving beam.

7. The method of claim 6,
    wherein the sub-group order is changed based on the following equation:

$$i2 = i3;$$
$$j2 = \mathrm{pattern}\left[\left[\frac{j3-1}{\mathrm{N\_Sym}}\right] + 1\right][i3] * \mathrm{N\_Sym} + (j3-1)\mathrm{mod}\mathrm{N\_Sym} + 1;$$
$$i2, i3 \in [1, N_g], j2, j3 \in [1, N_L]$$
$$\mathrm{pattern}[k] = (\mathrm{pattern}[1] + k - 1)\mathrm{mod}K$$

wherein, i2 represents an old group number that a transmission beam of the plurality of transmission beams belongs to before the sub-group order change, j2 represents an old orthogonal frequency division multiplexing (OFDM) symbol number that the transmission beam corresponds to before the sub-group order change; i3 represents a new group number the transmission beam belongs to after the sub-group order change; j3 represents a new OFDM symbol that the transmission beam corresponds to after the sub-group order change; Ng represents the number of the plurality of groups; K represents the number of the plurality of sub-groups in each of the plurality of groups; k represents a $k^{th}$ sub-group in each of the plurality of groups; $N_L$ represents the number of transmission beams in each of the plurality of groups; N_Sym represents the number of transmission beams in each of the plurality of sub-groups;
wherein, pattern[1] is calculated based on the following equation:

$$\mathrm{pattern}[1][i] = (i-1)\mathrm{mod}\ K$$

wherein i represents the $i^{th}$ element of pattern[1], and the number of elements that pattern[1] has is equal to the number of the plurality of groups, $N_g$.

8. The method of claim 1, further comprising:
    transmitting the BRSs via the plurality of transmission beams to a user equipment (UE).

9. A method, to be employed by a user equipment (UE), the method comprising:
    receiving a plurality of beam reference signals (BRSs) via a plurality of groups of transmission beams from a base station, wherein the plurality of transmission beams in each of the plurality of groups are divided into a plurality of sub-groups, such that a receiving beam of the UE corresponds to a sub-group in each group of the plurality of transmission beams, wherein a reoccurrence rate for logical indexes assigned to sub-groups of the plurality of sub-groups which correspond to the same receiving beam is minimized;

selecting a pair of a receiving beam and a transmission beam from a plurality of receiving beams of the UE and the plurality of transmission beams, based at least in part on receiving power of the BRSs; and receiving information from the base station via the pair of the receiving beam and the transmission beam.

10. The method of claim 9,
wherein different transmission beams of the plurality of transmission beams cover different Azimuth angles of departure (AoD) and Zenith angles of departure (ZoD).

11. The method of claim 9,
wherein the number of the plurality of groups is determined at least in part on the number of the plurality of transmission beams and the number of orthogonal frequency division multiplexing (OFDM) symbols.

12. The method of claim 9,
wherein the number of the plurality of sub-groups is determined at least in part on the number of the plurality of transmission beams or the number of the plurality of groups of transmission beams.

13. The method of claim 9,
wherein logical index differences between every two adjacent transmission beams of the plurality of transmission beams in one sub-group of the plurality of sub-groups are equalized and maximized.

14. A base station, comprising;
a transceiver configured to map a plurality of beam reference signals (BRSs) onto a plurality of transmission beams; and
a control module configured to:
divide the plurality of transmission beams into a plurality of groups, at least in part on a plurality of logical indexes assigned to the plurality of transmission beams,
divide the plurality of transmission beams within each of the plurality of groups into a plurality of sub-groups, wherein a reoccurrence rate for logical indexes assigned to sub-groups of the plurality of sub-groups which correspond to the same receiving beam is minimized, and
change a transmission beam order in at least one of the plurality of groups to equalize and maximize logical index differences between transmission beams of the plurality of transmission beams, which are adjacent to one another in a respective sub-group among the plurality of sub-groups.

15. The base station of claim 14,
wherein different transmission beams of the plurality of transmission beams cover different Azimuth angles of departure (AoD) and Zenith angles of departure (ZoD).

16. The base station of claim 14,
wherein the number of the plurality of groups is determined at least in part on the number of the plurality of transmission beams and the number of orthogonal frequency division multiplexing (OFDM) symbols.

17. The base station of claim 14,
wherein the number of the plurality of sub-groups is determined at least in part on the number of the transmission beams or the number of the transmission beam groups, and
one receiving beam of a user equipment (UE) corresponds to one sub-group in each group of the plurality of transmission beams.

18. The base station of claim 14,
wherein the transmission beam order is changed based on the following equations:

$$i1 = i2;$$

$$j1 = \left[(j2-1)\text{modN\_Sym} * K + \left[\frac{(j2-1)}{\text{N\_Sym}}\right] + (i2-1) * K\right] \text{mod} N_L + 1$$

$$i1, i2 \in [1, Ng], j1, j2 \in [1, N_L]$$

wherein, i1 represents an old group number that a transmission beam of the plurality of transmission beams corresponds to before the transmission beam order change, j1 represents an old orthogonal frequency division multiplexing (OFDM) symbol number that the transmission beam corresponds to before the transmission beam order change, i2 represents a new group number that the transmission beam belongs to after the transmission beam order change, j2 represents a new OFDM symbol number that the transmission beam corresponds to after the transmission beam order change, $N_g$ represents the number of the plurality of groups, K represents the number of the sub-groups in each of the groups, $N_L$ represents the number of transmission beams in each of the plurality of groups, and N_Sym represents the number of transmission beams in each of the sub-groups.

19. A user equipment (UE), comprising:
a transceiver configured to receive a plurality of beam reference signals (BRSs) via a plurality of groups of transmission beams from a base station, wherein the plurality of transmission beams in each of the plurality of groups are divided into a plurality of sub-groups, such that a receiving beam of the UE corresponds to a sub-group in each group of the plurality of transmission beams, wherein a reoccurrence rate for logical indexes assigned to sub-groups of the plurality of sub-groups which correspond to the same receiving beam is minimized; and
a control module configured to select a pair of a receiving beam and a transmission beam from a plurality of receiving beams of the UE and the plurality of transmission beams, based at least in part on receiving power of the BRSs;
wherein, the transceiver is further configured to receive information from the base station via the pair of the receiving beam and the transmission beam.

20. The UE of claim 19,
wherein a transmission beam order is changed based on the following equations:

$$i1 = i2;$$

$$j1 = \left[(j2-1)\text{modN\_Sym} * K + \left[\frac{(j2-1)}{\text{N\_Sym}}\right] + (i2-1) * K\right] \text{mod} N_L + 1$$

$$i1, i2 \in [1, Ng], j1, j2 \in [1, N_L]$$

wherein, i1 represents an old group number that a transmission beam of the plurality of transmission beams corresponds to before the transmission beam order change, j1 represents an old orthogonal frequency division multiplexing (OFDM) symbol number that the transmission beam corresponds to before the transmission beam order change, i2 represents a new group number that the transmission beam belongs to after the transmission beam order change, j2 represents a new OFDM symbol number that the transmission beam corresponds to after the transmission beam order change, $N_g$ represents the number of the plurality of groups, K represents the number of the sub-groups in each of the groups, $N_L$ represents the number of transmission beams in each of the plurality of groups, and N_Sym represents the number of transmission beams in each of the sub-groups.

* * * * *